April 26, 1949.  J. L. WATERS  2,468,316
POWER DRIVEN HAND TRUCK AND
TRANSMISSION THEREFOR
Filed March 28, 1947  3 Sheets-Sheet 2
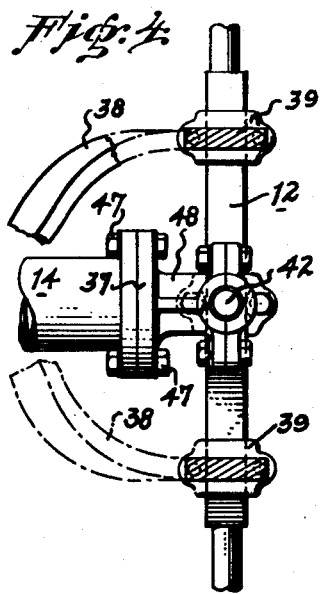
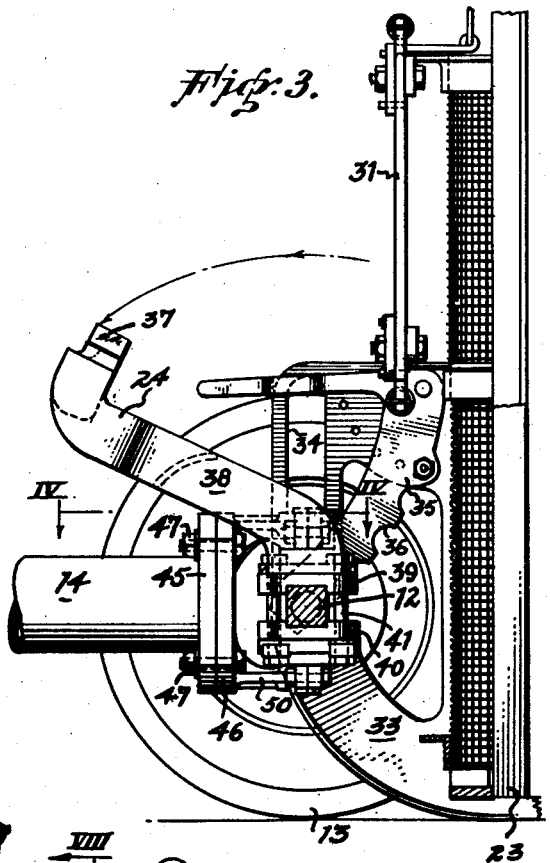
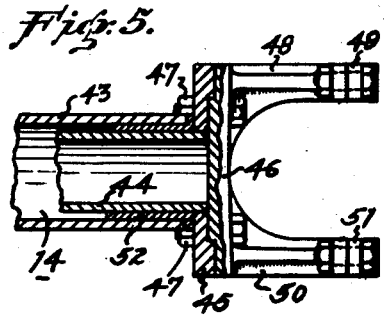
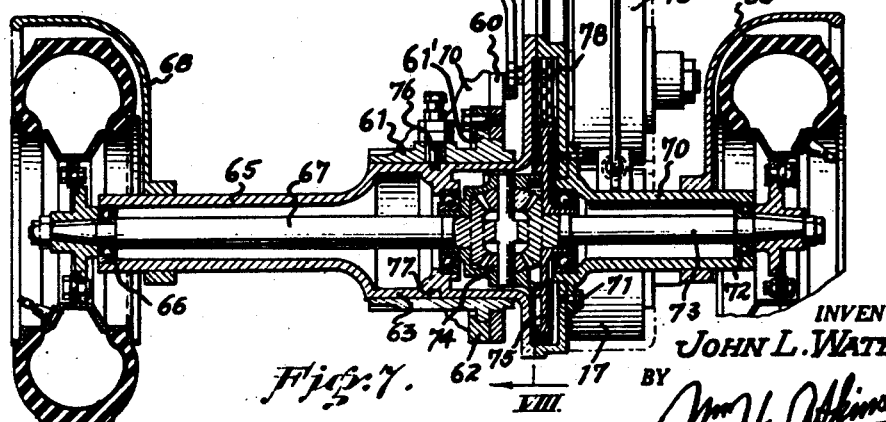
INVENTOR.
JOHN L. WATERS.
BY
ATTORNEY.

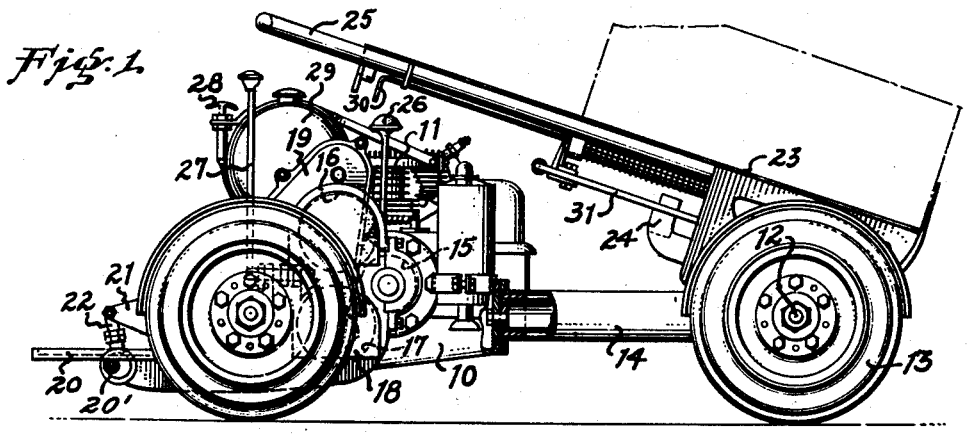
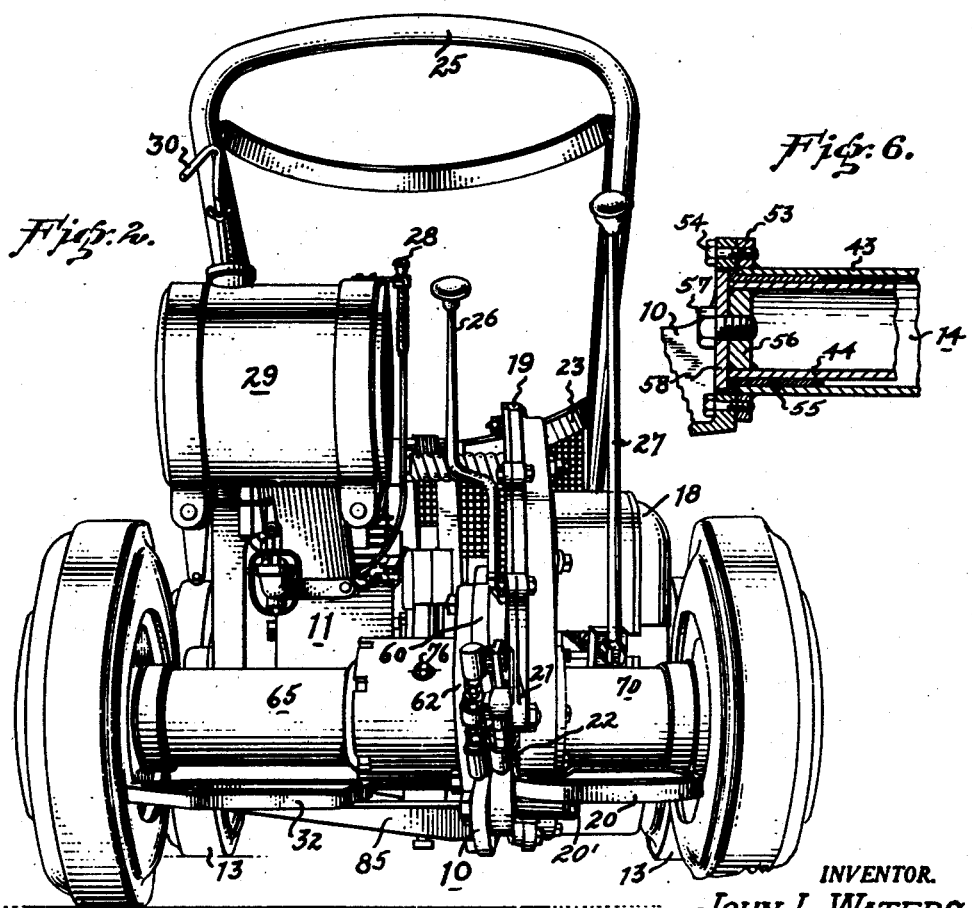

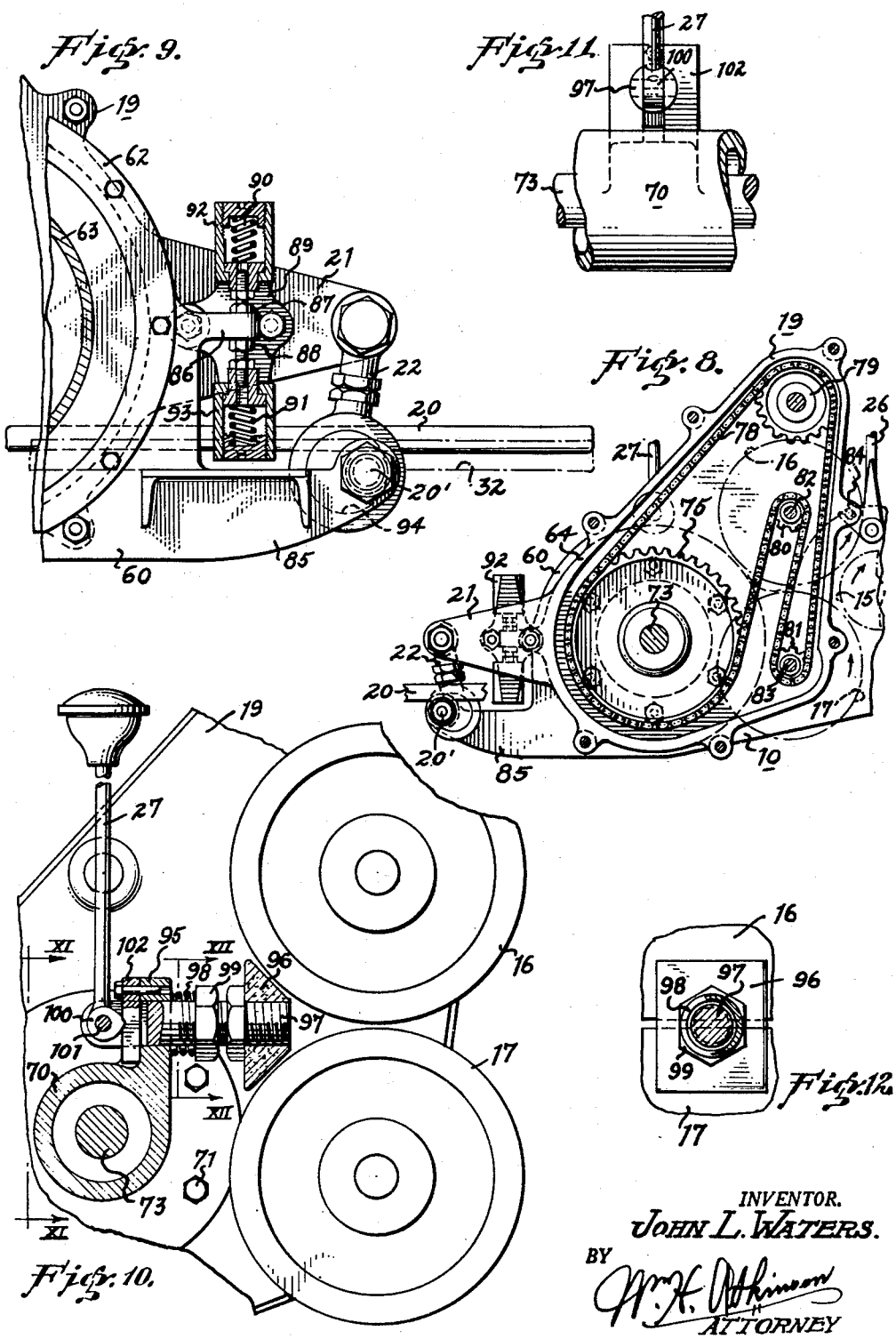

Patented Apr. 26, 1949

2,468,316

UNITED STATES PATENT OFFICE 2,468,316

POWER-DRIVEN HAND TRUCK AND TRANSMISSION THEREFOR

John L. Waters, Salem, Oreg., assignor to Xpediter Corporation, Seattle, Wash., a corporation of Washington Application March 28, 1947, Serial No. 737,876

5 Claims. (Cl. 180—54)

The present invention relates to industrial trucks such as are particularly adapted for transporting baggage, boxes, barrels, etc., for short distances and more particularly to a new and improved form of chassis and driving means for such a truck.

One of the objects of the invention is to provide an improved chassis for an industrial truck which will be found particularly suited for use in a load carrying truck such as is disclosed in my prior patent, No. 2,377,389, issued June 5, 1945, and entitled, "Motorized hand truck."

Another object of the invention is to provide a power driven truck of the above character having four wheels and in which a novel articulated connection is provided between the front and rear ends of the truck to provide for an easy steering and uniform contact between the wheels and the ground when travelling over uneven terrain.

Another object of the invention is to provide a novel form of power transmission means for establishing a forward and reverse driving connection between a prime mover and differentially connected driving wheels at the rear end of the chassis of the truck.

A further object of the invention is to provide a simple and effective control for connecting a prime mover to the driving wheels of the truck and in which an operation of the control may be effected by the weight of an operator while riding upon the truck and/or manually by the operator when standing alongside of the truck.

Other objects and advantages of the invention will be evident to those skilled in the art and also pointed out hereinafter in connection with the following description taken in connection with the accompanying drawings, wherein there is shown by way of illustration and not of limitation a preferred embodiment thereof.

In the drawings:

Figure 1 is a side view showing in its entirety a truck constructed in accordance with the invention, Figure 2 is an enlarged perspective view showing the rear end of the truck illustrated in Figure 1 of the drawings, Figure 3 is a fragmentary view partially in section showing a detail of the truck and a load carrying frame of the type disclosed in my aforesaid patent mounted thereupon, Figure 4 is a fragmentary detail partially in section taken along line IV—IV of Figure 3, looking in direction of arrows, Figure 5 is a fragmentary sectional view of one of the parts shown in Figure 3, Figure 6 is an enlarged fragmentary view in section showing a further detail of the part illustrated in Figure 5 of the drawings, Figure 7 is a vertical sectional view looking forward and taken along the center line of the rear axle of the truck as shown in Figures 1 and 2 of the drawings, Figure 8 is a fragmentary side view of the power transmitting connection, shown in Figures 1 and 2, with its cover removed to reveal the interior details, Figure 9 is an enlarged fragmentary back view of a portion of the transmission shown in Figure 8 of the drawings, Figure 10 is a fragmentary view partially in section showing details of an improved braking device contemplated by the invention, Figure 11 is a fragmentary view of the braking device taken along line XI—XI and looking in direction of arrows in Figure 10 of the drawings, and Figure 12 is a fragmentary view taken along line XII—XII of Figure 10 looking in direction of arrows.

As shown in Figure 1 of the drawings the present truck, as distinguished from the truck of my prior patent, is of the four wheel type and this therefore presents the problem of providing a truck chassis which will accommodate the four wheels thereof to an uneven ground surface. To this end the chassis is composed of two parts, one in the form of a trailing portion which is a cast frame-like structure 10 that carries an internal combustion engine or prime mover power plant 11. This frame-like structure 10 also provides a support for a rear axle housing which will accommodate a differential drive and extending shafts upon which the rear wheels of the chassis are mounted. The other portion of the chassis which forms a front or steerable portion of the truck consists of a rigid axle structure 12 upon which the front wheels are journaled to rotate independently of each other. The frame-like structure 10 or trailing portion of the chassis is connected in a novel manner to the front axle or steerable portion 12 by means of a forwardly extending tongue-like member 14 which is to be described in detail hereinafter. In connection with this illustration it should be stated that the prime mover 11 and the power transmitting mechanism associated therewith is of the type shown in my issued patent, No. 2,430,625, dated November 11, 1947, and entitled, "Reversing drive mechanism."

In this particular arrangement the prime mover 11 is provided with a power delivery cylinder 15 which is mounted outwardly from its right side and arranged in cooperating relation therewith, the power transmitting mechanism includes two spaced and parallel extending power take-off cylinders 16 and 17, here shown by dotted lines, as enclosed within a stationary housing 18 which, as will hereinafter appear, is mounted to rock about the axis of the shafts upon which the rear wheels are mounted. As a means for producing a rocking of the supporting housing 19 to thus control the transmission of power from the prime mover 11 to the rear wheels of the truck, the frame-like structure 10 is also shown as provided with a rockable platform 20 upon which an operator may ride when the truck is in motion. This rockable platform 20 is shown in the drawings as journalled upon the frame-like structure 10 by means of a transversely extending stub shaft 20' is connected to an arm 21 carried by the rockable supporting housing 19 by means of a link 22. In this view the front end or steerable portion of the truck is also shown as having a load supporting frame 23 of the type described and claimed in my above identified prior patent. While it is considered that the novel features of my present invention will be found to work particularly well with the load supporting frame 23 of this type, it is to be understood that the invention will be found equally useful in connection with the other types of load carrying means. A feature of the load carrying frame 23 here shown is that it may be tilted forwardly about the axis of the front wheels to pick up a load and then reclined rearwardly where it will be held by a holding bracket 24 which is carried by the front axle forming structure 12 of the truck. With the truck constructed in this manner, it will be seen that an operator while riding upon the trailing portion of the truck and with one foot upon the platform 20, may by shifting his weight cause the prime mover 11 to become connected to and disconnected from the transmission mechanism enclosed in the supporting housing 19. At the same time the operator may by grasping a rearwardly extending portion 25 of the load supporting frame 23 easily effect a steering of the truck by swinging the load supporting frame to the right or left. At the same time the operator will be within easy reaching distance of a manual transmission control lever 26, a brake lever 27, and a gas throttle controlling means 28, all of which are conveniently located upon the frame-like structure 10 of the chassis. At this point it should also be noted that the manual transmission control lever 26 and the brake control lever 27 are so located upon the frame 10 that they may also be reached by an operator standing at the right hand side of the truck where the operator might on occasions be required to be as in tilting a packing case or other article while the truck with its load supporting frame 23 tilted forwardly is moved into position for a picking up of the load. From this position the operator can also more easily handle the tilting of the load supporting frame 23 back into its reclining position and into latching engagement with the holding bracket 24, after which he can again assume his position upon the chassis where control of the truck will again be under foot control by a rocking of the platform 20 as above suggested.

Upon referring to Figure 2 of the drawings, it will be noted that the gas throttle controlling means 28 is secured at its upper end to the supporting band of a fuel tank 29 which is located at the rear of the prime mover 11. This location of the throttle controlling means 28 places it in easy reach of the operator while grasping the rearwardly extending portion 25 of the load supporting frame 23. Immediately forward of the fuel tank 29, the frame 23 carries a controlling lever 30 by which latch bars 31, shown in Figure 1, may be actuated to release same from the holding bracket 24, as explained in my above identified prior patent. In addition to the above features, this figure of the drawing also shows the chassis as having a stationary platform 32 which in cooperation with the rockable foot platform 20 provides a safe and convenient support for an operator who when standing on these platforms 20 and 32 may ride along with the truck. At the same time the operator can steer the truck by swinging the rearwardly extending portion 25 of the load supporting frame 23 to the right or left as desired.

As is more clearly shown in Figure 3 of the drawings, the load supporting frame 23 is of the type disclosed in my prior patent. This load supporting frame 23, as here shown, is provided with a pair of downwardly extending side plates 33 that have an elongated slot 34 in which the ends of the axle 12 are adapted to move as when balancing the load supporting frame 23 thereupon. In order to control the positioning of the axle 12 along the slot 34 and thus determine its fulcrum point, when balancing a load thereupon, the side plates 33 of the load supporting frame 23 also carry notched pivotally mounted sectors 35 which have a plurality of spaced notches 36 that are adapted to engage with the axle 12 and thus position the axle 12 at any desired point along the length of the slots 34 when the load carrying frame 23 is in its rearwardly reclining position. Then when the load supporting frame 23 is tilted rearwardly into its reclining and load supporting position the latch bars 31 carried thereby will be brought into interlocking relation with a shouldered latching abutment 37 formed at the outer end of the holding bracket 24.

As is more clearly shown in Figure 4 of the drawings, the holding bracket 24 is of wishbone shape and at its ends, designated by the numeral 38, it is clamped rigidly upon the axle 12. At this point it should be noted that the axle 12 is deliberately made of square cross-section throughout the major portion of its length and is only of round cross-section at its ends. As is more clearly shown in Figure 3, the ends 38 of the holding bracket 24 are provided with a notched facing 39 that is clamped to the axle 12 by means of notched clamping plates 40 and bolts 41. Between the ends 38 of the holding bracket 24 and centrally between the front wheels 13 the axle 12 is also provided with axially aligned and oppositely disposed vertically extending spindles 42 to which the tongue-like member 14 of the trailing portion of the chassis is steerably connected. This connection between the axle 12 and steerable portion of the chassis and the frame 10 and trailing portion of the chassis may be better described in connection with Figures 5 and 6 of the drawing where, in the former figure it will be seen that the forwardly extending tongue-like member 14 is formed of an outer cylindrical member 43 and an inner cylindrical sleeve 44 which are disposed in telescoping relation therein. The inner cylindrical sleeve 44 is welded at its forward end to a flanged coupling member 45 to which a forwardly extending bifurcated bearing bracket 46 is bolted by means of bolts 47. This bifurcated bearing bracket 46 has an upper arm 48 which carries a bearing 49 in which the upwardly extending spindle of the axle 12 is journaled and at its lower side it has a similar arm 50 which carries a bearing 51 within which the downwardly extending spindle 42 of the axle 12 is journaled. In this particular figure of the drawing it will also be noted that the outer cylindrical sleeve 43 of the trailing portion of the chassis and the inner cylindrical sleeve 44 of the steerable portion of the chassis are held in spaced relation at their forward ends by means of a flanged cylindrical bearing 52 which is disposed therebetween at this point. Now with particular reference to Figure 6 of the drawings it will be seen that the outer cylindrical sleeve 43 of the tongue-like member 14 is shown as welded to a flange forming ring 53 which is clamped to the frame-like structure 10 of the chassis by means of bolts 54 and disposed between this end of the outer and inner cylindrical sleeves 43 and 44 there is a second flanged cylindrical bearing 55 which in conjunction with the cylindrical bearing 52 at the other end of the tongue-like member 14 provide for a free rotation of the outer and inner cylindrical sleeves 43 and 44 with respect to each other. Welded within the rear end of the inner cylindrical sleeve 44 there is a closure plate or plug 56 into which a retaining bolt 57 is threaded and secured to this plate or plug 56 by the bolt 57 there is a retaining disc 58 which extends outwardly and into overlapping relation with the flanged end of the bearing 55 and the end of the outer cylindrical sleeve 43. This provides a means for securing the cylindrical sleeves 43 and 44 of the tongue-like member 14 against axial displacement with respect to each other and in this way there is formed a rigid beam-like connection between the axle 12 or steerable portion and the trailing portion of the chassis. This will provide for a steering of the truck and at the same time permit a lateral rocking of the front axle 12 with respect to the frame 10 and thus maintain a firm contact between the four wheels of the chassis and any ground surface irrespective of its irregularities.

Reference is now made to Figure 7 of the drawings, wherein the rear axle mounting and the driving aspects of my improved truck are shown in section. As here illustrated, the frame-like structure 10 has a rearwardly extending vertical plate-like extension 60 which is bored transversely to receive a hub forming cylinder 61 which is secured thereupon by a clamping ring 62. This hub forming cylinder 61 is adapted to accommodate a cylindrical extension 63 that is formed integrally upon a side 64 of the supporting housing 19 which, as previously described, carries the power take-off cylinders 16 and 17. This cylindrical extension 63 is continued outwardly beyond the cylindrical portion 63 as at 65 and also forms a support for a bearing 66 at the outer end of a stub axle 67 for one of the rear wheels of the chassis. A fender 68 which is disposed over the rear wheel at this side of the chassis is also supported from this extension 65. The other side of the supporting housing 19, here designated by the numeral 69, likewise carries an axle supporting extension 70 which is flanged and secured thereto by means of bolts 71. At its outer end this axle supporting extension 70 has a bearing 72 in which is journaled the outer end of a stub axle 73 which carries the other of the rear wheels. At their inner ends the stub axles 67 and 73 carry the conventional beveled gears which mesh with planetating beveled gears 74 that are carried by a ring gear or sprocket 75 which, as will hereinafter appear, is adapted to be driven in a forward and reverse direction by a single drive chain which connects with each of the power take-off cylinders 16 and 17. This provides a differential form of drive between the two rear wheels of the chassis and when the ring sprocket 75 is rotated it will be seen that the chassis will be driven in forward or reverse direction depending upon which of the power take-off cylinders 16 or 17 are brought into contact with the power delivery cylinder 15 of the prime mover 11. In order to provide for this assembly and prevent lateral displacement of the rear axle structure above described with respect to the frame-like structure 10 there is a keying pin 76 which engages with an annular slot 77 formed in cylindrical portion 63 of the housing 19. From the preceding description it will at once be seen that the entire rear wheel and axle assembly of my improved truck will be held in firm attachment upon the frame 10 by means of the hub forming cylinder 61. In this connection, however, it is important to note that the hub forming cylinder 61 is capable of eccentric adjustment with respect to the plate-like extension 60 of the frame-like structure 10 which supports the internal combustion engine or prime mover 11 with its power delivery cylinder 15. The reason for this eccentric adjustability between the hub forming cylinder 61 and the rear axle assembly is to permit of a proper working clearance between the power delivery cylinder 15 of the prime mover 11 and the power take-off cylinders 16 and 17 which are carried by the enclosing housing 19. To provide for this adjustment it will be noted that the hub forming cylinder 61 has an eccentrically disposed portion with a flange 61' which extends into the vertical plate-like extension 60 of the frame 10 where the clamping ring 62 in cooperation with the flange 61' will serve to hold the hub forming member 61 and consequently the entire rear axle assembly including the two power take-off cylinders 16 and 17 in any desired position of adjustment with respect to the power delivery cylinder 15. In this way the clearances between the power delivery cylinder 15 and the power take-off cylinders 16 and 17 may be adjusted to any desired dimension. The amount of rocking movement which will be required of the rear axle assembly and the housing 19 in order to bring the power take off cylinders 17 and 18 into and out of driving engagement with the power delivery cylinder 15 may also be controlled by this adjustment.

As is more clearly shown in Figure 8 of the drawings, the ring gear or chain sprocket 75 is connected to the power take-off cylinders 16 and 17, here indicated by dot and dash lines, by means of a single continuous sprocket chain 78 that passes over an idling sprocket 79 mounted within the upper part of the housing 19 and over smaller sprockets 80 and 81 that are keyed upon shafts 82 and 83 which are driven respectively by the power take-off cylinders 16 and 17. With this arrangement and a disposition of the chain 78, as here illustrated, it will be seen that when the power take-off cylinder 15 turning in a clockwise direction, as indicated by arrow, and the housing 19 is rocked forwardly and downwardly to bring the power take-off cylinder 16 into engagement therewith the driving chain sprocket 75 will be turned in a clockwise direction and thus cause the truck to be driven in a forward direction, whereas if the housing 19 is rocked upwardly and rearwardly to bring the power take-off cylinder 17 into engagement with the power delivery cylinder the driving chain sprocket 75 will be turned in counter-clockwise direction and thus cause the truck to be driven in a backward direction. It will also be noted from this figure of the drawing, because of the connecting link 22 which is disposed eccentrically between the rockable platform 20 and the arm 21 carried by the housing 19, that this rocking of the housing 19 may be accomplished by a rocking of the platform 20 under the weight of an operator standing thereupon. As an alternative, it will also be seen that, because of its pivotal mounting upon the frame structure 10 and a forked connection 84, the housing 19 may be rocked in a similar manner by an operation of the lever 26.

As is more clearly shown in Figure 9 of the drawings in addition to the rearwardly extending portion 60 which carries the hub forming cylinder 61, the frame-like structure 10 also has a rearwardly projecting portion 85 upon which the stationary platform 32, indicated by dot and dash lines, and the rockable platform 21 carried by the stub shaft 20' are mounted. This extending portion 60 of the frame-like structure 10 also has a rearwardly extending boss 86 that projects rearwardly in spaced parallel relation with the rearwardly extending arm 21 where it is positioned between oppositely disposed yielding and adjustable abutment forming studs 87 and 88 which engage with the top and bottom sides thereof. In this particular arrangement the oppositely disposed abutments 87 and 88 are mounted upon a bracket 89 that is carried by the rearwardly extending arm 21. These abutment forming studs 87 and 88 are biased into a housing centering relation against the boss 86 by means of compression springs 90 and 91 that are respectively disposed in cylindrical spring seats 92 and 93 which are formed as a part of the bracket 89. In this way it will be seen that by adjusting the compression of the springs 90 and 91 it will be possible to center the rearwardly extending arm 21 and the supporting housing 19 in such a position that the power take-off cylinders 16 and 17 will be yieldingly held in a neutral position and out of contact with the power delivery cylinder 15 of the prime mover 11. Then when the rockable platform 20 is rocked it will, because of the eccentric connection 94 at the lower end of the link 22, cause the housing 19 to be rocked in either direction desired against the centering action of the compression springs 90 and 91.

From the above it will be seen that an operator may cause the truck to be driven in a forward or reverse direction by merely rocking the rockable platform 20 so as to bring one or the other of the power take-off cylinders 16 and 17 into driving engagement with the power delivery cylinder 15. At the same time it will also be understood that the truck may be brought to stop when traveling in either direction by rocking the supporting housing 19 in a direction which will bring the oppositely rotating power take off cylinder 16 or 17 into frictional engagement with the power delivery cylinder 15, and while this form of control might suffice for operating the truck on level ground, the present invention also contemplates the provision of a novel form of braking means by which the speed of the truck may be retarded after disconnection from the prime mover 11 and/or held in a stationary condition when unattended. This braking mechanism and the details thereof are more clearly shown in Figures 10, 11 and 12 of the drawings to which reference is now made. As indicated in these showings, the axle supporting extension 70 of the rear axle assembly carries an upwardly extending flange 95 upon which a spring pressed brake shoe 96 of wedge-like configuration is mounted. In this particular device the brake shoe 96 is shown as secured by threading upon the end of a horizontally extending stud 97 and as located in a position where it will simultaneously engage with the outer surfaces of the power take off cylinders 16 and 17. The stud 97 is mounted to slide freely within the upwardly extending flange 95 and it is biased to move the brake shoe 96 into braking relation with the power take off cylinders 16 and 17 by means of a compression spring 98 that is disposed between the upwardly extending flange 95 and an adjusting nut 99 carried by the stud 97. At its other end the stud 97 is split to accommodate a cam-like hub 100 which is formed upon the lower end of the brake lever 27 which is pivotally mounted upon transversely extending pin 101. The cam-like hub 100 is so designed that when the brake lever 27 is in its vertical position it will engage with a notched cam plate 102 which is interposed between it and the upwardly extending flange 95 and thus compress the spring 98 and hold the brake shoe 96 in its retracted or neutral position and out of braking contact with the power take off cylinders 16 and 17. Contrariwise when the operating lever 27 is moved forward or to the rear the cam-like hub 100 thereof will be rocked out of notched engagement with the notch plate 102 and permit the spring 98 to move and hold the brake shoe 96 into braking engagement with the power take off cylinders 16 and 17.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a load transporting truck of the character described, the combination of a chassis having a rigid transversely extending axle with wheels journalled upon its ends and forming a forward steerable portion of the chassis, a trailing portion for said chassis having driving wheels and a platform therebetween upon which an operator may ride while operating the truck, a power plant mounted upon said trailing portion connected in driving relation with said driving wheels, a hollow tubular member rigidly attached to the trailing portion of said chassis extending toward said front axle, a second tubular member hingedly connected to said front axle for movement relative thereto in a horizontal plane and extending rearwardly into telescoping relation with said hollow tubular member, and means for securing said members in telescoping relation without interfering with relative rotation thereof, whereby said steerable portion may be turned to effect a steering of said chassis and also rock transversely with respect to said trailing portion to maintain the wheels in contact with a supporting surface.

2. In a power driven vehicle of the character described, the combination of a chassis having a rear axle with a differential and wheels driven thereby, a prime mover having a horizontally extending power delivery cylinder at one side thereof, a supporting housing journaled to rock in a vertical plane about the axis of said rear axle and having two spaced horizontally disposed power take-off cylinders extending from one side thereof and adapted to be selectively brought into power receiving relation with said power delivery cylinder, a yielding spring means for normally holding said supporting housing in a neutral position with its power take-off cylinders out of engaging relation with the power delivery cylinder of said prime mover, an operator supporting platform pivotally mounted upon said chassis and connected with said supporting housing, whereby said supporting housing may be rocked in either direction from its neutral position to bring one or the other of its power take-off cylinders into driving engagement with said power delivery cylinder, and a single chain and sprockets providing connection between the differential of said rear axle and each of said power take-off cylinders through which a forward or reversed driving connection may be established between said prime mover and the rear axle of said chassis.

3. In a power driven vehicle of the character described, the combination of a chassis having a rigid axle with differentially driven wheels, a prime mover mounted upon said chassis forward of said rear axle, a supporting housing journaled to rock in a vertical plane about the axis of said rear axle and having a power transmission means adapted to be brought into power transmitting relation with said prime mover by a rocking of said housing, a yielding spring means for normally holding said supporting housing in a neutral position with respect to said prime mover, an operator supporting platform mounted to rock upon said chassis and connected to said supporting housing, whereby said supporting housing may be rocked from its neutral position by an operator standing thereupon to bring said transmission means into driving relation with said prime mover, and a manually operated means for rocking said supporting housing in a manner corresponding to that provided for by said operator supporting platform when the operator is not upon said platform.

4. In a power driven truck of the character described, the combination of a chassis having a forward load carrying steerable portion and a trailing power plant supporting portion, a prime mover power plant mounted upon the trailing portion of said chassis having an extending power delivery cylinder at one side thereof, a power take-off mechanism pivotally mounted to rock about the rear axle of said chassis, said power take-off mechanism having two spaced friction rollers adapted to be moved into engageable relation with the power delivery cylinder of said power plant as said power take-off mechanism is rocked, a driving connection between each of said friction rollers and the rear axle of said chassis, means for pivotally rocking said power take-off mechanism about the rear axle of said chassis to bring one or the other of its said friction rollers into power take-off engagement with the power delivery cylinder of said power plant, and means for adjusting the position of said rear axle with respect to said prime mover power plant to establish a proper clearance between said friction rollers and said power delivery cylinder.

5. In a power driven truck of the character described, the combination of a chassis having a forward load carrying steerable portion and a trailing power plant supporting portion, a prime mover power plant mounted upon the trailing portion of said chassis having an extending power delivery cylinder at one side thereof, a power take-off mechanism journaled to rock about the axis of the rear axle of said chassis in a vertical plane transverse to the axis of said power delivery cylinder, a pair of spaced friction rollers carried by said power take-off mechanism and engageable with the power delivery cylinder of said power plant, a driving connection between each of said friction rollers and the rear axle of said chassis, means for rocking said power take-off mechanism about the axis of the rear axle of said chassis to bring one or the other of said pair of friction rollers into engagement with the power delivery cylinder of said power plant, whereby said chassis may be driven in a forward or reverse direction by the operation of said means, and means for adjusting the position of said rear axle with respect to the trailing portion of said chassis, whereby the clearance between the friction rollers of said power take-off mechanism and said power delivery cylinder may be regulated as desired.

JOHN L. WATERS.

REFERENCES CITED

The following references are of record in the file of this patent:

UNITED STATES PATENTS

| Number | Name | Date |
| --- | --- | --- |
| 895,368 | Hargrove | Aug. 4, 1908 |
| 2,069,245 | Haines | Feb. 2, 1937 |
| 2,377,389 | Waters | June 5, 1945 |
| 2,422,813 | Walch | June 24, 1947 |
| 2,430,625 | Waters | Nov. 11, 1947 |